(12) United States Patent
Cohen et al.

(10) Patent No.: US 11,593,963 B2
(45) Date of Patent: Feb. 28, 2023

(54) SINGLE VIEW TRACKING OF CYLINDRICAL OBJECTS

(71) Applicants: MASSLESS CORP., Wilmington, DE (US); Jack Andrew Cohen, Romford (GB); Dominic Jason Hosler, Romford (GB)

(72) Inventors: Jack Andrew Cohen, Romford (GB); Dominic Jason Hosler, Romford (GB)

(73) Assignee: MASSLESS CORP., Wilmington, DE (US)

( * ) Notice: Subject to any disclaimer, the term of this patent is extended or adjusted under 35 U.S.C. 154(b) by 177 days.

(21) Appl. No.: 17/046,617

(22) PCT Filed: Mar. 13, 2019

(86) PCT No.: PCT/GB2019/050706
§ 371 (c)(1),
(2) Date: Oct. 9, 2020

(87) PCT Pub. No.: WO2019/175582
PCT Pub. Date: Sep. 19, 2019

(65) Prior Publication Data
US 2021/0110556 A1    Apr. 15, 2021

(30) Foreign Application Priority Data

Mar. 13, 2018  (GB) ...................... 1804025

(51) Int. Cl.
*G06T 7/73* (2017.01)
*G06F 3/0354* (2013.01)

(52) U.S. Cl.
CPC ............ *G06T 7/75* (2017.01); *G06F 3/03545* (2013.01)

(58) Field of Classification Search
CPC .... G06T 7/70; G06T 7/73; G06T 7/75; G06T 2207/10068; G06T 2207/30004–30104; G06T 2207/30204; G06T 2207/30208; G06T 7/20; G06T 7/246; G06T 7/251; G06F 3/033; G06F 3/03545; G06F 3/0346; G06F 3/041; G06F 3/0425; A61B 34/20;
(Continued)

(56) References Cited

U.S. PATENT DOCUMENTS

| | | |
|---|---|---|
| 5,818,424 A | 10/1998 | Korth |
| 2005/0024379 A1 | 2/2005 | Marks |

(Continued)

FOREIGN PATENT DOCUMENTS

| | | |
|---|---|---|
| WO | 2008046940 A1 | 4/2008 |
| WO | 2019175582 A1 | 9/2019 |

OTHER PUBLICATIONS

Tonet, Oliver, et al. "Tracking endoscopic instruments without a localizer: ashape-analysis-based approach." Computer Aided Surgery 12.1 (2007): 35-42. (Year: 2007).*

(Continued)

*Primary Examiner* — Geoffrey E Summers
(74) *Attorney, Agent, or Firm* — Finch & Maloney PLLC

(57) ABSTRACT

The present invention relates to tracking objects. Specifically, the present invention relates to determining the position and/or location of styli from image data.
Aspects and/or embodiments seek to provide a method for determining an orientation and/or a position of a cylindrical object from image data using a single viewpoint.

20 Claims, 5 Drawing Sheets

(58) Field of Classification Search
CPC .... A61B 2034/2055; A61B 2034/2065; A61B 5/061; A61B 5/064; A61B 90/39; A61B 2090/3937; A61B 2090/3941; A61B 2090/3945; A61B 2090/3966; A61B 2090/397–3979; A61B 2090/3983; G06V 10/225; G06V 10/44; G06V 10/757; G06V 30/1423; G06V 30/32
See application file for complete search history.

(56) References Cited

U.S. PATENT DOCUMENTS

| | | | |
|---|---|---|---|
| 2005/0026689 A1* | 2/2005 | Marks | G06T 7/73 463/36 |
| 2008/0167818 A1 | 7/2008 | Kimber et al. | |

OTHER PUBLICATIONS

Welch, Greg, and Gary Bishop. "An introduction to the Kalman filter." (Year: 2006).*
International Search Report and Written Opinion received for Patent Application No. PCT/GB2019/050706, dated Aug. 12, 2019. 17 pages.
International Preliminary Report on Patentability received for Patent Application No. PCT/GB2019/050706, dated Sep. 15, 2020. 12 pages.
Dayak, E. and Cevik, U., "3D Pose Estimation for Laparoscopic Instruments: A Single Camera and a Planar Mirror Approach," 9th International Conference on Electrical and Electronics Engineering (ELECO), Nov. 26, 2015. pp. 213-217.
Tonet, et al., "Tracking endoscopic instruments without a localizer: A shape-analysis-based approach," Computer Aided Surgery, vol. 12, No. 1, Jan. 1, 2007 pp. 35-42.
GB Search Report under Section 17(5) received for GB Application No. GB1804025.3, dated Sep. 3, 2018. 3 pages.

* cited by examiner

400

500

502

504

506

SINGLE VIEW TRACKING OF CYLINDRICAL OBJECTS

FIELD

The present invention relates to tracking objects. Specifically, the present invention relates to determining the position and/or location of styli from image data using a single viewpoint.

BACKGROUND

Current technology allows for the tracking of an object using a single camera. In such tracking systems, the object being tracked is required to have infra-red "marker" LEDs placed on the surface of the object. In this way, using a camera, it is possible to pattern-match the object, and specifically the infra-red "marker" LEDs placed on the surface of the object, in order to calculate an orientation and position. The use of such a system however, is power consuming and limiting in terms of the range of objects and their sizes to which the system is applicable.

There are also many systems for tracking an object in three dimensions using multiple sensors (such as cameras) which are calibrated by location. These include systems where the multiple sensors are located on a tracked object where the object may be tracked using known fixed "lighthouse" base stations which provide reference points for tracking. These approaches require specialist equipment in order to make use of a full system to track a simple object such as a pen.

Various disadvantages of current tracking systems are described herein.

The need for a tracked object/device to communicate with an external tracking station results in the use of extensive space as well as specialist equipment for tracking the object.

The use of LEDs or other light sources require power consumption. Alternatively, some systems use reflectors to replace light sources on the surface of the object, but this requires additional resources in order to implement such tracking systems.

Object tracking technology is desired for use to provide virtual reality, augmented reality and mixed reality systems, but a large proportion of computing devices are not provided with specially configured sensors to provide this capability.

SUMMARY OF INVENTION

Aspects and/or embodiments seek to provide a method for determining an orientation and/or a position of a cylindrical object from image data using a single viewpoint.

According to an aspect, there is provided a method for determining a position and orientation of a cylindrical object having one or more rings circumscribing the surface of the cylindrical object using image data collected from a single imaging device and/or a single viewpoint wherein the image data comprises one or more images, the method comprising the steps of: identifying two or more lines in at least one of the one or more images; identifying one or more points on each of the one or more rings circumscribing the surface of the cylindrical object; determining the position and orientation of the cylindrical object from the two or more lines and the one or more points on each of the one or more rings circumscribing the surface of the cylindrical object.

According to another aspect, there is provided a method for determining a position and orientation of a substantially cylindrical object using image data collected from a single imaging device and/or a single viewpoint wherein the image data comprises one or more images, wherein the substantially cylindrical object comprises two or more rings circumscribing the surface of the substantially cylindrical object; the method comprising the steps of: identifying two or more points on each of the two or more rings circumscribing the surface of the substantially cylindrical object; determining the position and orientation of the substantially cylindrical object from the two or more lines and the two or more points on each of the one or more rings circumscribing the surface of the substantially cylindrical object.

Determining a position and orientation of a cylindrical or substantially cylindrical object, such as a stylus for example, using image data collected from a single imaging device and/or a single viewpoint can provide flexibility in object tracking without the requirement for extensive and specialist equipment. Objects that might be tracked, for example a stylus, are not always strictly cylindrical so optionally the method can be applied to strictly cylindrical objects.

Optionally, each distance between each of the rings circumscribing the surface of the cylindrical object is predetermined. Optionally, the radii of each of the rings are different. Optionally, the rings can be distinguished visually; optionally wherein the rings comprise any or any combination of: different coloured rings; different patterned rings; or the cylinder comprises different coloured or patterned or shaped regions bordering each ring in order to provide visual distinction between the rings.

If the distance between two (or more) rings is known, along with their radii, then it is possible to determine the position and orientation of a cylindrical or substantially cylindrical object more robustly. If it is possible to visually distinguish the two (or more) rings from each other, this can improve the robustness of the detection/tracking of the object.

Optionally, the substantially cylindrical portion of the substantially cylindrical object is the untracked portion of the cylindrical object; wherein the untracked portion of the cylindrical object is the portion of the cylindrical object between the two or more rings circumscribing the surface of the cylindrical object.

In some circumstances, the portion of the cylindrical object in between rings provided on its surface varies but the rings both have the same radius as each other. Optionally, the portion in between the rings on the cylinder is the "untracked" portion of the object. Optionally, the variation in radius along the length of the cylinder is not so extreme that the cylinder is too thin to occlude visibility of the rings, in that the untracked portion of the cylindrical object should be of sufficient diameter to substantially occlude visibility of a substantial portion of the circumference of the one of more rings, optionally wherein a substantial portion means that the object has a sufficiently similar diameter to the ring so as to occlude substantially the same proportion of the ring as a strictly cylindrical object would when viewed by a single-viewpoint camera.

Optionally, an image processing stage is performed on the one or more images comprising of using an edge detection filter. Optionally, the image processing stage further comprises of correcting the one or more images for lens distortion.

Image processing may serve to reduce the image to a linear perspective projection onto the image plane for the simplification of object tracking.

Optionally, the one or more images is stored as image data. Optionally, the step of identifying two or more lines in the image data is performed by performing an algorithmic transformation.

Use of an algorithmic transformation may serve to correctly identify two or more lines in the image data.

Optionally, the step of determining one or more candidates of the cylindrical object is performed by determining an angle between the two bounding lines. Optionally, the step of determining one or more candidates of the cylindrical object comprises a calibration stage. Optionally, the calibration stage comprises the steps of: positioning the cylindrical object in a particular orientation and/or location; imposing minimum and maximum distances from a camera; projecting the size of the diameter of the cylindrical object; and beginning the tracking process if the cylindrical object is within a set limit.

A calibration stage can assist the effective tracking of the cylindrical object, such as a stylus for example.

Optionally, two or more points on the surface of the cylindrical object are defined as three-dimensional positions. Optionally, the radius and/or the length of the cylindrical object is predetermined. Optionally, the two or more points is identified on one or more rings circumscribing the surface of the cylindrical object. Optionally, at least one pair of the one or more rings circumscribing the surface of the cylindrical object bounds one or more contrasting sections of the cylindrical object.

Alternatively, the one or more rings circumscribing the cylindrical object may be defined as the boundary between contrasting sections and/or the contrasting rings may be repeated along the length of the cylindrical object.

One or more rings circumscribing the surface of the cylindrical object may provide one or more location points on the cylindrical object from which the position of the cylindrical object may be determined.

Optionally, a radius of each of the one or more rings circumscribing the surface of the cylindrical object is predetermined.

Knowing the radius of the one or more rings can allow for determination of the position and orientation of the object.

Optionally, the one or more rings comprises two or more rings; and wherein each radius of each of the two or more rings circumscribing the surface of the cylindrical object are predetermined; and wherein one or more distances between each of the two or more rings circumscribing the surface of the cylindrical object is predetermined; and wherein the radii of each of the two or more rings are different.

Where the radii of two or more rings are different but known, and the distance between the two rings, or the distances between the two or more rings, along the length of the cylinder are known (i.e. predetermined) then it can be possible to track almost any substantially cylindrical object having two or more rings where the radii and separation distance are known.

Optionally, there is provided the method further comprising the steps of: identifying two or more lines bounding the cylindrical object; determining a direction of the cylindrical object; and determining the location of a front/back end of the cylindrical object.

The steps of: identifying two or more lines bounding the cylindrical object; determining a direction of the cylindrical object; and determining the location of a front/back end of the cylindrical object, may help effectively determine the position of the cylindrical object.

Optionally, there is provided the method further comprising the steps of: determining an image ray; identifying two or more points on the same edge of the cylindrical object; and determining one or more distances of separation between the two or more points on the same edge of the cylindrical object.

The steps of: determining an image ray; identifying one or more points on the edge of the cylindrical object, may allow for determining the position for the cylindrical object comprising of one or more rings circumscribing the surface of the cylindrical object.

Optionally, there is provided the method further comprising a step of determining the three-dimensional position of the two or more points on two or more edge lines of the cylindrical object. Optionally, there is provided the method further comprising the steps of: determining an image ray; determining at least one pair of one or more points within a bounded plane; determining the normal of the bounded plane; determining the position of the bounded plane; determining one or more projection vectors; determining one or more rays; determining a displacement vector; determining a distance between at least one pair of the one or more points within the bounded plane; determining one or more rays intersecting a mid-point of at least one pair of the one or more points within the bounded plane; and performing fixed point convergence.

The steps of: determining an image ray; determining at least one pair of one or more points within a bounded plane; determining the normal of the bounded plane; determining the position of the bounded plane; determining one or more projection vectors; determining one or more rays; determining a displacement vector; determining a distance between at least one pair of the one or more points within the bounded plane; determining one or more rays intersecting a mid-point of at least one pair of the one or more points within the bounded plane; and performing fixed point convergence, may allow for determining the position for the cylindrical object comprising of two or more rings circumscribing the surface of the cylindrical object.

Optionally, there is provided the method further comprising a step of determining one or more dimensional information and/or one or more surface image information of the cylindrical object from the image data.

Determining one or more dimensional information and/or one or more surface image information of the cylindrical object from the image data may provide the capability to track the cylindrical object by means of modelling the cylindrical object.

Optionally, there is provided the method further comprising the steps of: determining two or more planes containing the two or more lines; determining the axis of the cylindrical object; determining at least one pair of one or more corner points; determining one or more view vectors of at least one pair of one or more corner points; determining a difference vector and an average vector which are constrained to lay in the one or more planes; and determining a centre point of the cross-section of the cylindrical object. Optionally, the step of identifying two or more lines comprises of determining two or more edge lines of the cylindrical object.

The two or more edge lines of the cylindrical object may allow for the consistent tracking of the cylindrical object.

Optionally, the two or more edge lines is imaged under a perspective projection. Optionally, two or more points are determined on the two or more edge lines. Optionally, the step of identifying two or more lines further comprises the step of determining a centre line. Optionally, the centre line comprises an end point and a start point of the cylindrical object. Optionally, the step of identifying two or more lines determines six or more points on the cylindrical object comprising of two or more points on the two or more edge lines and two or more points on the centre line.

Optionally, the two or more lines and the two or more points on each of the two or more lines is input into an algorithm. Optionally, the algorithm comprises of: determining two or more planes; determining a plurality of arbitrary points; determining an infinite cylinder on the cylindrical object; determining a plurality of normals; determining a plurality of directions; determining one or more distances; determining a plurality of three-dimensional vectors; determining a plurality of equations; and determining one or more meeting points. Optionally, the two or more planes comprises of two or more bounding planes and a plane perpendicular to the centre line on the image data. Optionally, the plane perpendicular to the centre line passes through the origin and the end point and/or the start point of the cylinder. Optionally, the plurality of normals comprises of two or more outward-facing normals on the two or more bounding planes. Optionally, the plurality of arbitrary points on the centre line comprises of a point closest to the origin of the cross section of the cylindrical object.

The point closest to the origin of the cross section of the cylindrical object, such as a stylus for example, may provide a suitable point which may be trigonometrically determined.

Optionally, the infinite cylinder on the cylindrical object is determined using plurality of arbitrary points on the centre line, a direction of the centre line and a radius of a cross-section of the cylindrical object. Optionally, the plurality of directions comprises of a direction of the infinite cylinder and a direction to the point on the centre line from the origin.

The direction of the infinite cylinder can allow for appropriate determination of the orientation.

Optionally, the direction of the infinite cylinder is perpendicular to the two or more outward-facing normals. Optionally, the one or more distances comprises of a distance to the point on the centre line from the origin. Optionally, the plurality of three-dimensional vectors comprises of a three-dimensional vector for each defined point on the image data. Optionally, the plurality of equations comprises of an equation for the centre line of the infinite cylinder. Optionally, the two or more lines comprises of one or more of: a near edge line of the cylinder; the centre line of the cylinder; and/or a far edge line of the cylinder. Optionally, the one or more meeting points comprises one or more points where the one or more planes intersect with two or more lines. Optionally, the one or more meeting points comprises of the intersection point between the line containing the image location of the cylinder end and one or more of: a near edge line of the cylinder; the centre line of the cylinder; and/or a far edge line of the cylinder. Optionally, the one or more meeting points is a three-dimensional point of the front/back end of the cylindrical object. Optionally, the length of the cylinder is added or subtracted in order to get the front end and the back end three-dimensional point to the same location.

Optionally, there is provided the method further comprising the step of identifying one or more regions in the one or more images. Optionally, there is provided the method further wherein a predictive model determines one or more positions of the cylindrical object. Optionally, the predictive model uses one or more previous positions of the cylindrical object. Optionally, the one or more positions of the cylindrical object is stored as position data to be used as the one or more previous positions.

The one or more previous locations may help identify one or more current locations of the cylindrical object.

Optionally, the image data is extracted from the one or more regions of interest. Optionally, the image data is updated in the remaining frames once the active area of the cylindrical object is located. Optionally, the model of the cylindrical object comprises of a three-dimensional model of the cylindrical object Optionally, there is provided the method further comprising the step of determining the rotation of the cylinder. Optionally, the step of determining the rotation of the cylinder comprises a step of matching an image between two or more identified lines against a reference image of the surface of the cylindrical object. Optionally the step of determining the rotation of the cylindrical object comprises of image recognition of one or more surface features of the cylindrical object.

Determining the rotation of the cylindrical object may allow for the determination of the orientation about an axis of the cylindrical object.

Optionally, the step of determining the one- or more-dimensional information and/or one or more surface image information comprises a step of determining the dimensional information from a database of objects.

Determining the one- or more-dimensional information and/or one or more surface image information can assist the calibration stage of the cylindrical object.

According to a further aspect, there is provided an apparatus operable to perform the method of any preceding feature.

According to another aspect, there is provided a system operable to perform the method of any preceding feature.

According to a further aspect, there is provided a computer program operable to perform the method and/or apparatus and/or system of any preceding feature.

According to another aspect, there is provided a method for determining an orientation of a cylindrical object using image data collected from a single imaging device and/or a single viewpoint wherein the image data comprises one or more images, the method comprising the steps of: identifying a plurality of pairs of lines in at least one of the one or more images; determining a plurality of candidates of the cylindrical object from the plurality of pairs of lines; and determining the orientation of the cylindrical object from the plurality of candidates of the cylindrical object. Optionally, there is provided the method further comprising a step of determining a most likely candidate from the one or more candidates: optionally wherein the most likely candidate is a candidate with the highest probability; and/or optionally wherein the most likely candidate is chosen through a predictive model.

By determining a plurality of possible candidates for the object being detected/tracked, and selecting one of these, the method can be more robust when attempting to track objects.

According to a further aspect, there is provided a substantially cylindrical object operable for use in a human hand comprising two or more rings circumscribing the surface of the substantially cylindrical object; wherein each of the two or more rings having a known radius and wherein one or more distances between the two or more rings along a length of the object is predetermined; and the object suitable for use with the method of any preceding claim. Optionally, the object comprises any of: a pen; a stylus or a scalpel.

An object that can be tracked using a single camera/single-viewpoint camera can be provided according to an aspect.

BRIEF DESCRIPTION OF DRAWINGS

Embodiments will now be described, by way of example only and with reference to the accompanying drawings having like-reference numerals, in which.

SPECIFIC DESCRIPTION

Referring to FIGS. 1 to 4, example embodiments of a method of determining the orientation and optionally the position of a cylindrical object using a single viewpoint will now be described.

Figure 4:
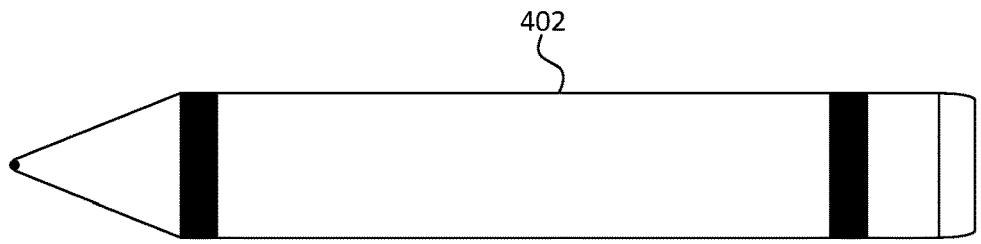
FIG. 4 shows a pen with two contrasting rings where one ring is positioned at the front and one towards the back, and also shows the edge points detected at the edges and the lines bounding the pen.
Figure 4:
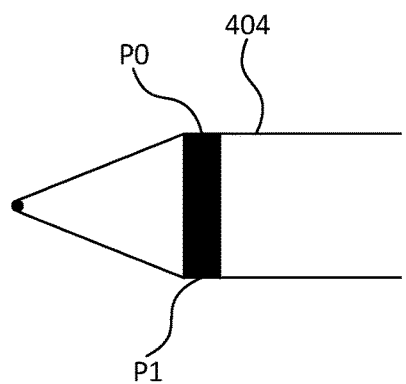
Figure 4:
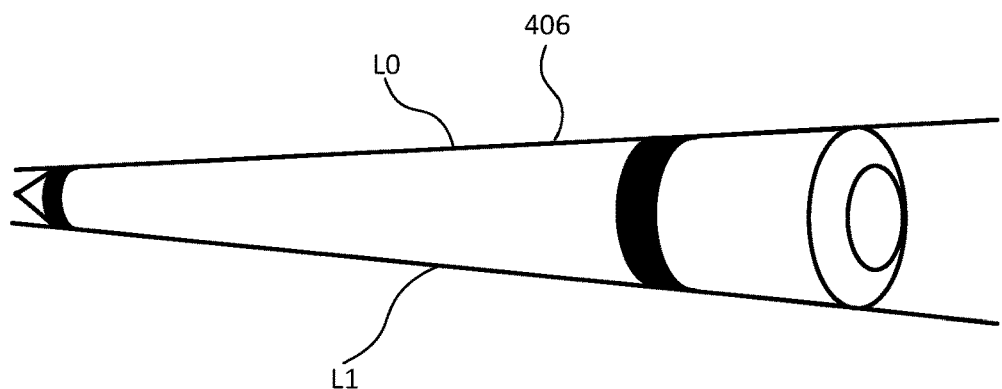

In an embodiment, methods to recognise a cylindrical object, such as a pen, and calculate its three-dimensional orientation and position using a single viewpoint are explained. However, in other embodiments, other such substantially cylindrical objects such as a wand, a sword, a tennis racket, or a baseball bat etc. may be recognised. Optionally, only the orientation may be determined. The objects optionally may have one or more rings on the surface of the cylindrical object. In this embodiment, it is assumed that the pen is purely cylindrical and that rings 402 are drawn around the cylindrical body along its surface, one at the front, and one at the back, as shown in FIG. 4, 400.

Figure 5:
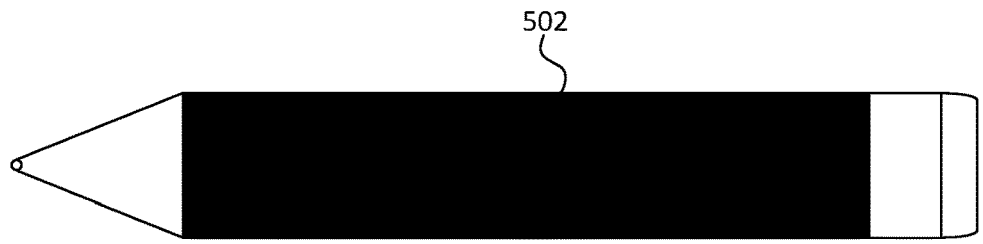
FIG. 5 shows a pen with two rings defined by the contrast between the midsection colour, and the end colours, a pen with multiple contrasting bands along the length. This defines a series of rings along the cylindrical object which can be used for tracking and also shows a pen with two rings defined by colour contrast, and a variation of the radius along the length between them.
Figure 5:
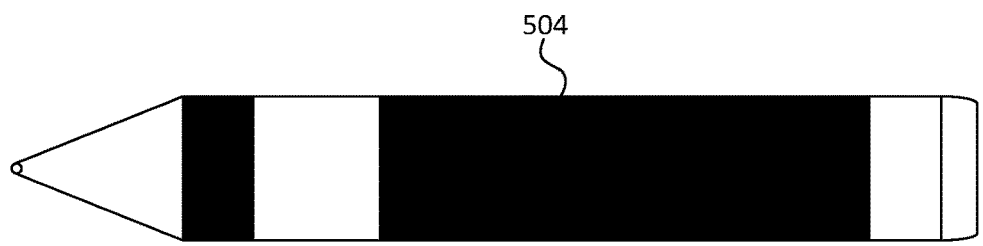
Figure 5:
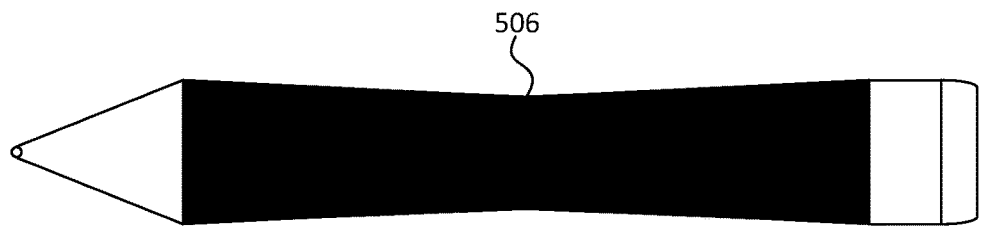

With reference to FIG. 5, other embodiments of the rings on the cylindrical object will now be described. The rings may not be bands of a different colour but are defined by a contrast in colour. The one or more rings may be alternating contrasting coloured bands along the length of the cylindrical object. Alternatively, the rings may be a boundary between contrasting colours. Variations may include fixed or variable segment lengths.

502 shows a pen with two rings defined by the contrast between the midsection, and the front/back end sections. This allows the circumscribing rings to be defined by the boundary between the contrasting colours. 504 shows a pen with multiple contrasting bands along the length. This defines a series of rings along the cylindrical object which may be used for tracking of the cylindrical object. 506 shows a pen with two rings defined by colour contrast, and a variation of the radius along the length between them. Such an object is capable of being tracked only if both rings are visible.

In an embodiment, the following methods may be implemented as code operating on a computing device such as, for example, a mobile 'phone. The mobile 'phone would then use a built-in camera to acquire images and process them through the following method, resulting in the position and orientation of the pen relative to the 'phone being available to other software running on the 'phone. The pen can then be used as an input device for the other software. Various cameras may be used within example embodiments including a standard full colour camera, a standard black and white camera and an infra-red camera.

An overview of the pen tracking process is as follows:
1. Run a sequence of images through an edge detection filter.
2. Identifying pairs of lines in the images (through Hough line transform or similar).
3. For the identified line pairs, identifying likely pen candidates (through predictive modelling) and choosing the most probable candidate.
4. Reconstructing the orientation of the pen from the most probable candidate.
5. Cropping the image between the lines, obtaining an image which contains the pen.
   At this point, image recognition may be performed in order to identify points, or perform machine learning on the pen, and specialise the algorithm based on recognised feature points.
6. However, for the contrasting rings that are positioned or drawn along the surface of the pen, it is possible to detect two edge points.

Given an image, Hough Line transformation or similar is performed. Next, looking at line pairs in the image, likely pen candidates are identified. By determining the candidate having the highest probability, the most probable candidate may be determined. The angle between the top and bottom lines become perpendicular as the pen direction approaches the direction of the line of sight between the camera and the pen. Tracking the pen by lines is not very useful in such a configuration. Therefore, a maximum angle between the bounding lines is imposed.

One method of imposing a maximum angle is proposed here. Letting the minimum angle between the pen's direction and camera's line-of-sight direction be given by tan $\theta = a/l$, letting the closest distance to the camera be a, the angle between the bounding lines may be calculated.

Another method involves a calibration stage, where a user holds the pen such that the pen's direction is parallel to the $\hat{x}$ axis, $|\hat{x} \cdot \hat{x}'| \sim 1$. If minimum and maximum distances from the camera are imposed, the projected size of the pen's diameter can be determined. The equations for the maximum and minimum diameter of the pen is as follows:

$$d_{max} = 2f \frac{a}{z_{min}} = 20af \qquad (1)$$

$$d_{min} = 2f \frac{a}{z_{max}} = 20af \qquad (2)$$

Letting $z_{min} = 0.1$ m, $z_{max} = 1$ m.

Therefore, the line pair $\rho$ difference $\Delta \rho$ must lie between $2af < \Delta \rho < 20\ af$. The tracking process begins if two lines are found where $\hat{n}_o \cdot \hat{n}_1 \sim 1$ and $2af < \Delta \rho < 20\ af$. From this point, the determined lines are tracked in time.

In this embodiment, a cylinder is defined as follows. All points on the surface of the cylinder are given by the following equations:

$$p(l, \theta, \alpha, \phi) = x_0 + l\hat{x}'(\alpha, \phi) + a\hat{\theta}(\theta, \alpha, \phi) \qquad (3)$$

$$\hat{\theta}(\theta, \alpha, \phi) = \cos \theta + \hat{y}' + \sin \theta \hat{z}' \qquad (4)$$

Where the basis $\hat{x}'$, $\hat{y}'$, $\hat{z}'$ is given by:

$$R = \begin{pmatrix} \cos\alpha\cos\phi & -\sin\alpha & \cos\alpha\sin\phi \\ \sin\alpha\cos\phi & \cos\alpha & \sin\alpha\sin\phi \\ -\sin\phi & 0 & \cos\phi \end{pmatrix} \quad (5)$$

$$R = (\hat{x}'|\hat{y}'|\hat{z}') \quad (6)$$

$$R = R_z(\alpha)R_y(\phi) \quad (7)$$

Figure 1:
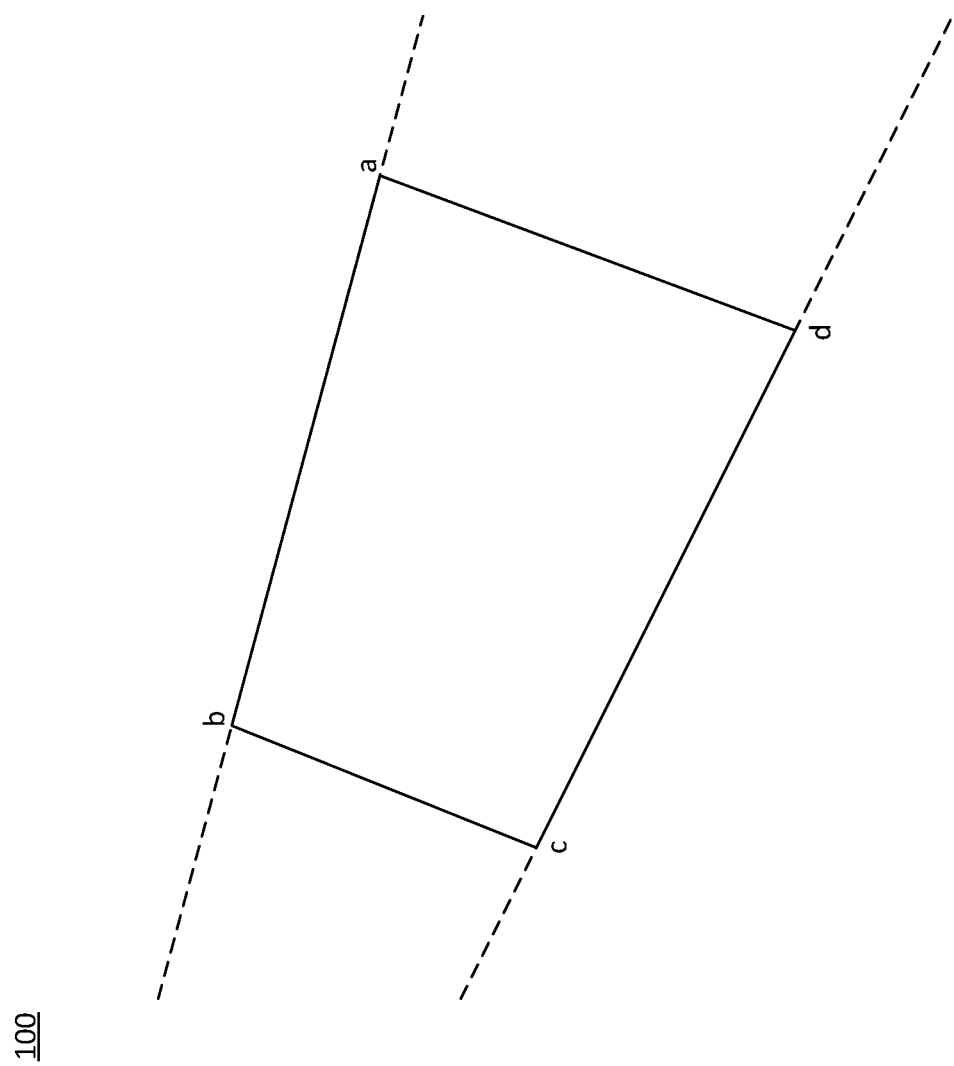
FIG. 1 shows a simplified image of the cylinder from the image data, showing four points and defining two edge lines.
Figure 2:
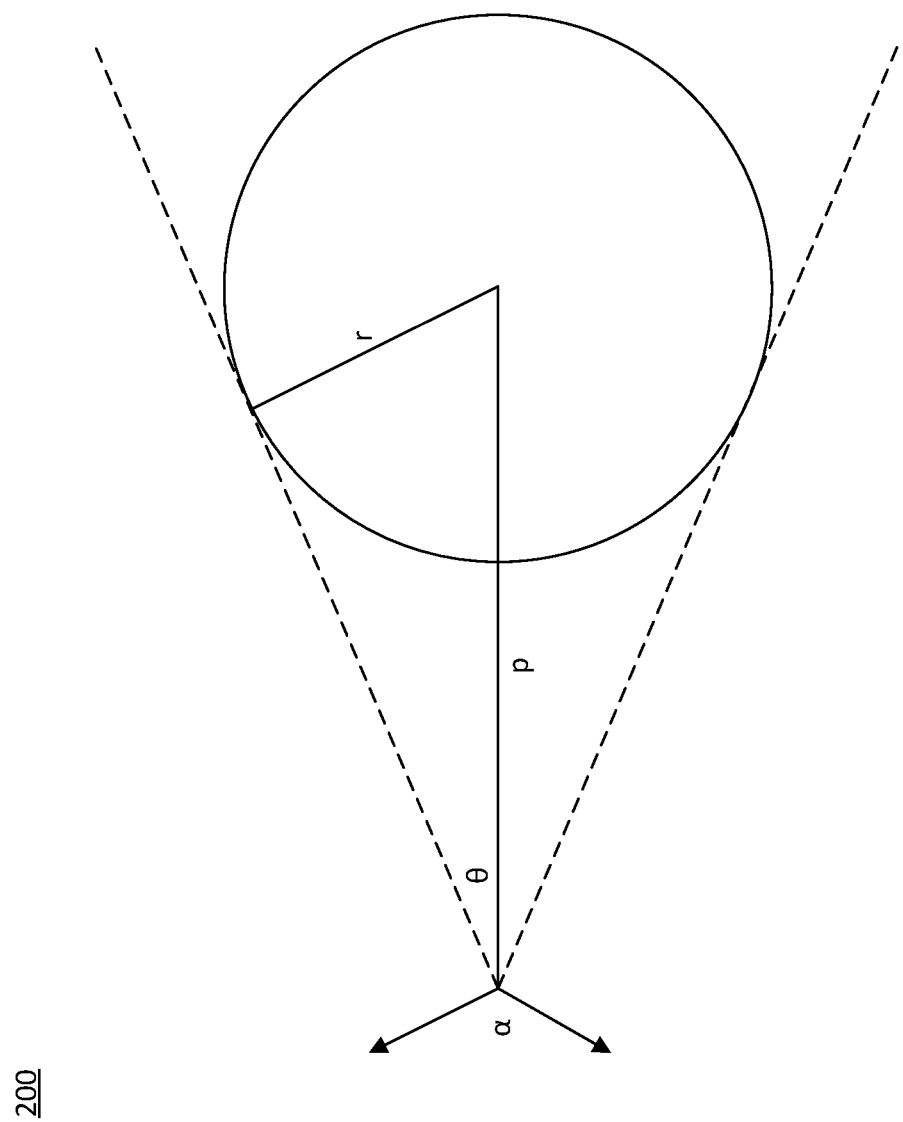
FIG. 2 shows a cross-section of the cylindrical object at the closest point to the origin.
Figure 3:
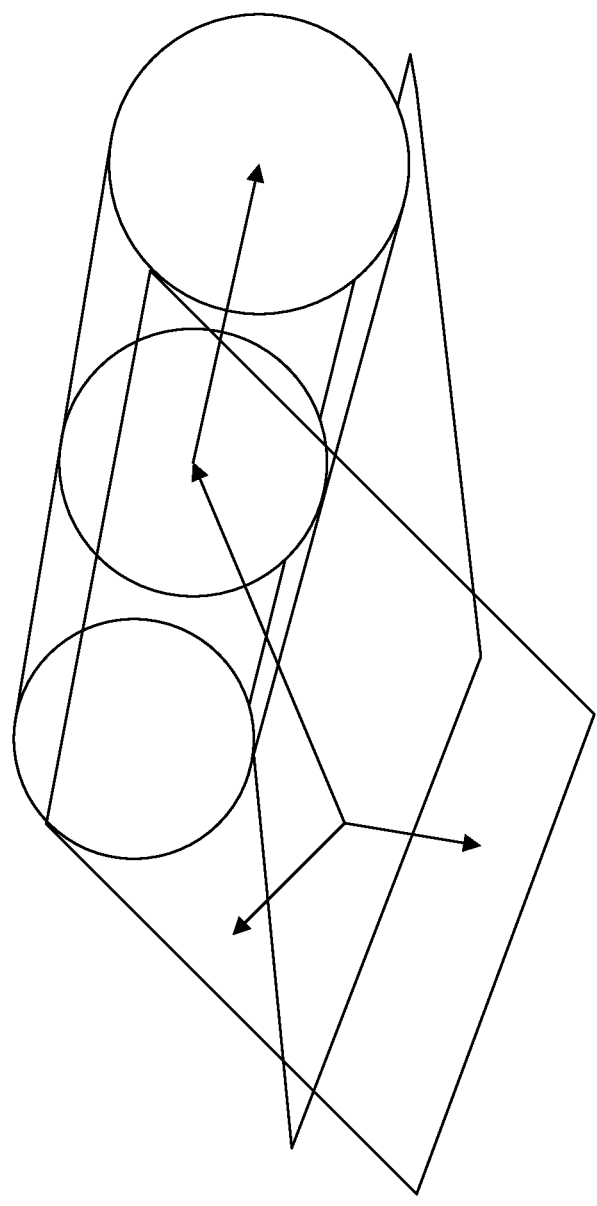
FIG. 3 shows a three-dimensional cylinder, and the planes that are given by the visible edge lines of the cylinder, and shows the centre line direction and the perpendicular distance to the centre line.

In an embodiment referring to FIGS. 1, 2 and 3, an algorithm is performed in stages to track a cylinder, knowing its radius and length. This is done using a single fully calibrated camera. The image processing prior to this serves to reduce the image to the linear perspective projection onto the image plane.

The calculations required to determine the full three-dimensional orientation and position of a cylinder from its image are provided herein. The image processing is assumed to already have been completed as a separate problem. Data is required to be extracted from the image. An infinite cylinder is found which fits the edge lines. Finally, the location of the tracked cylinder is determined along the infinite cylinder.

In this embodiment, the results are required from the image processing stage. The image locations which are required must be from the image where it only has linear perspective distortion. All lens distortion must already have been removed.

A basic algorithm to be used in the image processing is the following:
1. Remove noise
2. Find edge lines of the cylinder
3. Choose two points on each line
4. Find centre line
5. Find ends of cylinder along centre line This algorithm will determine six points in three groups of two: the top line of the cylinder defined by any two points along its length; the bottom line of the cylinder defined by any two points along its length; the centre line segment of the cylinder defined by the two points where the cylinder starts and ends. The top line and bottom line results are shown in FIG. 1, 100, the order the points should be returned is: a, b, c, d. The reason for the anti-clockwise direction of the points is such that the cross-product calculations are successful further on in the algorithm.

The full definition of bounding planes through the origin is given by their normals. The convention is taken that the normals will always face outwards, such that they are parallel (not antiparallel) with the normals of the outer surface of the cylinder where they touch. Defining the infinite cylinder requires an arbitrary point on the centre line, the direction of the centre line and the radius. The convention is taken such that the arbitrary point on the centre line calculated is the closest point of that centre line to the origin.

In order to find the normals of the planes from the image data, the projected image of the cylinder is required and two points on each edge. By taking two points on each edge, the outward facing normals to the two bounding planes are determined. In FIG. 1, the ends should be rounded in reality, but they are displayed as straight. As shown in FIG. 1, 100, the vertices have been labelled, and as long as the labels rotate in the anti-clockwise direction and correctly pair the top line/bottom line pairs, the normals will be determined correctly. First, the three-dimensional position vectors of the points on the image plane are required to be constructed.

This is done using the x and y components in the image, and the focal length for the z component. The normals of the bounding planes from the image data are determined using the following equations:

$$\underline{a} = \{a_x, a_y, F\} \quad (8)$$

$$\underline{b} = \{b_x, b_y, F\} \quad (9)$$

$$\underline{c} = \{c_x, c_y, F\} \quad (10)$$

$$\underline{d} = \{d_x, d_y, F\} \quad (11)$$

$$\hat{n}_1 = \frac{\underline{a} \times \underline{b}}{|\underline{a} \times \underline{b}|} \quad (12)$$

$$\hat{n}_2 = \frac{\underline{c} \times \underline{d}}{|\underline{c} \times \underline{d}|} \quad (13)$$

The direction of the centre of the cylinder must be perpendicular to both normals of the planes as determined. The reason for this is that the centre of the cylinder is always perpendicular to the normal of its surface, and the planes are tangents to the cylinder, each touching one line of the cylinder. The direction of the infinite cylinder is determined using the following equation:

$$\hat{\underline{v}} = \hat{n}_1 \times \hat{n}_2 \quad (14)$$

The direction to the point on the centre line is opposite to the combined directions of the plane normals. This can be seen from FIG. 3, 300 where it is clear that, because of the outward facing convention, it must be the opposite direction. The direction to the point on the centre line is determined using the following equation:

$$\hat{\underline{p}} = -\frac{\hat{n}_1 + \hat{n}_2}{|\hat{n}_1 + \hat{n}_2|} \quad (15)$$

Referring to FIG. 2, 200, the distance to the point on the centre line is given by trigonometry from the plane perpendicular to $\hat{\underline{v}}$ going through the origin and the point on the centre line. The cylinder is a circle with a known radius, r, and the distance from the origin is the hypotenuse, p. The trigonometry for this right-angled triangle gives the following derivation:

$$\frac{r}{p} = \sin(\theta) \quad (16)$$

Converting $\theta$ to $\alpha$ using:

$$\theta = \frac{\pi}{2} - \frac{\alpha}{2} \quad (17)$$

The hypotenuse is determined as:

$$p = \frac{r}{\cos\left(\frac{\alpha}{2}\right)} \quad (18)$$

Then, implementing the half-angle formula and the fact that:

$$\cos(\alpha) = \hat{n}_1 \cdot \hat{n}_2 \quad (19)$$

The final expression for the distance is determined as:

$$p = \frac{\sqrt{2}\, r}{\sqrt{\hat{n}_1 \cdot \hat{n}_2 + 1}} \quad (20)$$

The position of the finite cylinder along the infinite cylinder is to be determined. This is done using the final two points found from the image $\underline{e}$ and $\underline{f}$. These will be found on the centre line between the top and bottom lines of the cylinder. The 'front' point of the cylinder is defined as $\underline{e}$ and the 'back' point of the cylinder is defined as $\underline{f}$. The calculation process is the same for both 'front' and 'back' points, the calculation for $\underline{e}$ is shown below. First, the plane perpendicular to the centre line on the image, passing through the origin and $\underline{e}$, is found. This is done best by finding any two vectors inside the plane perpendicular to the centre line and using the following definition of a plane:

$$\underline{r} = O + a\underline{s} + b\underline{t} \quad (21)$$

O is the origin, a and b are variables and $\underline{s}$ and $\underline{t}$ are the vectors within the plane. The origin of the plane in this case is the origin of the coordinate system. Hence, the origin may be removed from the formula. The two vectors are determined as:

$$\underline{s} = \{e_x, e_y, F\} \quad (22a)$$

$$\underline{t} = \{e_y \cdot f_y, f_x \cdot e_x, 0\} \quad (22b)$$

Normalisation of the two vectors $\hat{s}$ and $\hat{t}$ is not required as this would only alter the scaling of a and b which will be later eliminated. This defines the plane through: the origin; the end of the cylinder; and perpendicular to the image line of the centre of the cylinder.

In this embodiment, the visibility of the end caps of the cylindrical object must be determined i.e. if the end caps are visible (flat), if the cylinder goes to a point (centre) or if they are completely invisible (empty). Depending on this and the knowledge of the angles, it is possible to determine whether the visibility of the end point is the near edge of the cylinder, the centreline or the far edge of the cylinder. The knowledge of the angles is dependent on the comparison between the orientation of the cylindrical object and whether if the end cap in questions is directed "towards" or "away" from the camera. Once this has been determined, an equation for a line based on one of three possible starting points p for the line is used. These line equations are as follows:

$$\underline{p} = (p - r)\hat{p} \quad (23a)$$

$$\underline{p} = p\hat{p} \quad (23b)$$

$$\underline{p} = (p + r)\hat{p} \quad (23c)$$

This defines the near edge of the cylinder, the centre line of the cylinder and the far edge of the cylinder respectively. The full equation of the line is given by the following:

$$\underline{r} = \hat{p} + l\hat{v} \quad (24a)$$

$$\underline{r} = (p - r)\hat{p} + l\hat{v} \quad (24b)$$

$$\underline{r} = p\hat{p} + l\hat{v} \quad (24c)$$

$$\underline{r} = (p + r)\hat{p} + l\hat{v} \quad (24d)$$

In this embodiment, the plane and the line will always intersect such that the position vector of that intersection point can be determined. Equating this cylinder line with the plane will determines the three-dimensional point that is required.

Using equations 22a and 22b for the plane, $$a\underline{s} + b\underline{t} = (p - r)\vec{p} + l\vec{v} \quad (25)$$

and equating coefficients, l can be determined by eliminating the other variables, which will determine a fully defined three-dimensional point. This point is the location of the 'front' of the cylinder. Repeating the same procedure for the 'back' of the cylinder, $\underline{f}$, another value of l is determined. By adding or subtracting the length of the cylinder the points can be directed to the same location. Error may be reduced in this step by means of averaging. A fully defined three-dimensional point for the front end of the cylinder and a vector in the direction of the cylinder are thus determined.

In another embodiment, the orientation reconstruction process is carried out as follows. Given two lines as shown in FIG. 4, 406, which bound the pen $l_0: (\rho_0, \theta_0)$, $l_1: (\rho_1, \theta_1)$, the apolar direction in which the pen is pointing, x', is determined. Letting $u_i$ be the projection vector of the line origin, also corresponding to a tangent vector of the plane and $\hat{v}$ the direction of the line tangent in the focal plane, corresponding to another tangent vector in the plane orthogonal to the previous plane, the following equations can be found:

$$\hat{u}_i = (p_i \cos \theta_i - w_i p_i \sin \theta_i - h_i f) \quad (26)$$

$$\hat{v}_i = (-\sin \theta_i, \cos \theta_i, 0) \quad (27)$$

$$\hat{n}_i = \hat{u}_i \times \hat{v}_i \quad (28)$$

Where w=W/2, h=H/2. The cross product of these two normals gives the x' direction of the cylinder as follows:

$$\hat{x}' = \hat{n}_0 \times \hat{n}_1 \quad (29)$$

In order to get the polar direction i.e. the correct sign, the location of the tip of the pen is required. If the line is written in the following form:

$$ax + by + c = 0 \quad (30)$$

then a=cos θ, b=sin θ, c=−ρ. This form is often more convenient for calculations, and the projection vectors may be determined as follows:

$$\hat{u}_i = (-ca - w, -cb - h, f) \quad (31)$$

$$\hat{v}_i = (-b, a) \quad (32)$$

In this embodiment, the orientation reconstruction process is carried out wherein an image ray R(λ) is defined by casting a line from the camera origin to the image point i=(x,y,f), where x, y are the image pixel coordinates and f is the focal length of the camera.

$$R(\lambda) = \lambda \hat{\imath} \quad (33)$$

$$\hat{\imath} = \frac{i}{|i|} \quad (34)$$

$$\hat{\imath} = \frac{(x, y, f)}{\sqrt{x^2 + y^2 + f^2}} \quad (35)$$

In another embodiment referring to FIG. 4, methods to recognise a cylindrical object, such as a pen, and calculate its three-dimensional orientation and position using one or more rings visible on the surface of the cylindrical object are explained.

In an embodiment wherein two rings are visible as shown in FIG. 4, 402 or optionally FIG. 5, 502, a three-dimensional position may be reconstructed using the edge points on the two rings. Given two edge points, on the same side of a cylinder, separated by a known distance the three-dimensional position can be reconstructed by the following process:

$$R_1(\lambda_1) - R_0(\lambda_0) = l\hat{x}' \tag{36}$$

$$\lambda_0 = \lambda_1 \left( \frac{\hat{x}' \times \hat{t}_1}{\hat{x}' \times \hat{t}_0} \right) \tag{37}$$

$$\lambda_1 = l \frac{\hat{t}_0 \cdot \hat{x}'}{\hat{t}_0 \cdot \hat{t}_1 \left( \frac{\hat{x}' \times \hat{t}_1}{\hat{x}' \times \hat{t}_0} \right)} \tag{38}$$

This can then be used to reconstruct the thee-dimensional position of the edge points.

In an embodiment wherein only one ring is visible as shown in FIG. 4, 404 or optionally FIG. 5, 502, a three-dimensional position may be reconstructed using a pair of edge points on the ring. Given two edge points on a ring and the normal direction of the plane it sits on, the circles position is reconstructed. From the two points, the projection vectors and the ray can be calculated. The line between these points, q, must lie in the plane, therefore, $$(R_1(\lambda_1) - R_0(\lambda_0)) \cdot \hat{x}' = 0 \tag{39}$$

$$\lambda_1 = \lambda_0 \left( \frac{\hat{t}_0 \cdot \hat{n}}{\hat{t}_1 \cdot \hat{n}} \right) \tag{40}$$

such that the displacement vector is given by, $$q(\lambda_0) = \lambda_0 \left[ \left( \frac{\hat{t}_0 \cdot \hat{n}}{\hat{t}_1 \cdot \hat{n}} \right) \hat{t}_1 - \hat{t}_0 \right] \tag{41}$$

$$q(\lambda_0) = \lambda_0 u \tag{42}$$

If the distance, b, between the two points is known, then $\lambda_0$ can be solved for by $q(\lambda_0)=b$. A good estimate is $b=2a$, however, this is not precisely correct. The edge points are given by the condition that the viewing vector is perpendicular to the surface normal. This condition is given by $p(l,\theta,\alpha,\phi) \cdot \hat{\theta}(\theta,\alpha,\phi) = 0$ or, $$x_0 \cdot \hat{\theta} + a = 0 \tag{43}$$

$$x_0 \cdot (\cos\theta\hat{y}' + \sin\theta\hat{z}') + a = 0 \tag{44}$$

$$\cos\theta x_0 \cdot \hat{y}' + \sin\theta x_0 \cdot \hat{z}' + a = 0 \tag{45}$$

Let $u=\cos\theta$ such that $\sin\theta=(1-u^2)^{1/2}$ giving the following equation, $$ux_0 \cdot \hat{y}' + (1-u^2)^{1/2} x_0 \cdot \hat{z}' + a = 0 \tag{46}$$

$$au^2 + b^2 + c = 0 \tag{47}$$

with coefficients $$a = (x_0 \cdot \hat{y})^2 + (x_0 \cdot \hat{z})^2 \tag{48}$$

$$b = 2a x_0 \cdot \hat{y} \tag{49}$$

$$c = a^2 - (x_0 \cdot \hat{z})^2 \tag{50}$$

such that the edge angle, $\cos\theta_e$, is determined through the following equation:

$$\cos\theta_e(x_0) = \frac{-b \pm \sqrt{b^2 - 4ac}}{2a} \tag{51}$$

The exact length for the chord between the two edge points is given by $b=2a\cos\theta_e$. The circle centre is related to the mid-point between the edge points by, $$r_m = x_0 + a\cos\theta_e(x_0)\hat{z}' \tag{52}$$

The equation for the mid-point ray is given by, $$R_m(\lambda_0) = \frac{\lambda_0}{2} \left[ \hat{t}_0 + \left( \frac{\hat{t}_0 \cdot \hat{n}}{\hat{t}_1 \cdot \hat{n}} \right) \hat{t}_1 \right] \tag{53}$$

$$R_m(\lambda_0) = \frac{\lambda_0}{2} v \tag{54}$$

If $|q(\lambda_0)|=2a\cos\theta_e$ and the value of $\lambda_0$ is substituted into $R_m(\lambda_0)$, by relating this to $r_m$, $x_0$ is determined. This results in the following expressions:

$$x_0 + a\cos\theta_e(x_0)\left(\hat{z} - \frac{v}{|u|}\right) = 0 \tag{55}$$

$$x_0 + af(x_0, \hat{y}', \hat{z}')\left(\hat{z} - \frac{v}{|u|}\right) = 0 \tag{56}$$

These questions can be solved numerically in order to determine the position of the cylindrical object.

In another embodiment, an algorithm is performed in stages in order to track a cylindrical object such as a pen. However, other such cylindrical object may be used consistent with the spirit of the invention.

From the image, two lines are found, $l_0:(\rho_0,\theta_0)$, $l_1:(\rho_1,\theta_1)$ as shown in FIG. 4, 406. For each line its corresponding plane normal is constructed as below, $$a=\cos\theta, b=\sin\theta, c=-p \tag{57}$$

$$u=(-ca-w, -cb-h, f) \tag{58}$$

$$\hat{v}=(-b, a, 0) \tag{59}$$

$$\hat{n}=\hat{u} \times \hat{v} \tag{60}$$

From the two plane normals $\hat{n}_0$, $\hat{n}_1$ the axis of the cylinder, $\hat{x}'$ is reconstructed by, $$\hat{x}' = \hat{n}_0 \times \hat{n}_1 \tag{61}$$

From the image, two corner points $P_0$, $P_1$ on the cylinder are measured as shown in FIG. 4, 404. These points are also given as a path length $s_0$, $s_1$ along the lines $l_0$, $l_1$ as shown in FIG. 4, 406. These determine the view vectors $\hat{t}_0, \hat{t}_1$.

$$P = (-ca - sb - w, -cb + sa - h, f) \quad (62)$$

$$\hat{t} = \frac{P}{|P|} \quad (63)$$

From these view vectors, the difference and the average vectors are constructed that are constrained to lay in the plane with normal as follows:

$$u = \left[\frac{\hat{t}_0 \cdot \hat{x}'}{\hat{t}_1 \cdot \hat{x}'}\right] \hat{t}_1 - \hat{t}_0 \quad (64)$$

$$v = \left[\frac{\hat{t}_0 \cdot \hat{x}'}{\hat{t}_1 \cdot \hat{x}'}\right] \hat{t}_1 + \hat{t}_0 \quad (65)$$

$$\hat{y}' = \hat{u} \quad (66)$$

$$\hat{z}' = \hat{x}' \times \hat{y}' \quad (67)$$

From the above, the circle centre may be found which defines the position of the cylindrical object and its circumscribing ring.

In another embodiment, the roll of the cylindrical object can be tracked by using image recognition on the surface of the cylinder. The roll of the cylindrical object may be tracked by cropping the image of the cylindrical object at the top and bottom, and transforming the image of the cylindrical object in order to "flatten" its surface. This can then be matched to a reference image, and the roll may be calculated.

The reference image may be learned from a calibration stage whereby a user allows a camera to capture the cylindrical object and rolls/rotates the cylindrical object such that the full surface of the cylindrical object is shown to the camera. A reference image may also be found in a database of cylindrical objects, stored either locally or in the cloud.

In a further embodiment, where a substantially cylindrical object provided with rings on its surface has a varying radius and where the rings have different but known radii and known separation, the position and orientation of the object can be tracked.

Being able to apply the position and orientation tracking methods to these types of objects allows for a much wider variety of objects to be able to be tracked in this way.

Users or manufacturers, for example, would need to measure and provide the parameters to the algorithm providing the tracking method, for example on their computer or mobile device. Many existing pens and similar implements can be "loaded" into this tracking method with no alteration to their physical nature, and optionally parameters for any such existing pens and similar implements can be identified in a database for retrieval and use by users of the tracking method/algorithm. Optionally, the bar code of the pens and similar implements can be used to identify the parameters required (or like method/system of identification to a 2D/3D bar code can be used, for example one can use any of a RFID, NFC, or Bluetooth communication protocol (or other such protocol) to identify the make and model of the object and identify the relevant dimensions/parameters from a local or remote database).

When the rings have different but known radii, and known separation, a slightly different method to calculate the position and orientation of the object compared to the previous embodiment is used. The two rings, being coaxial, define a cone. The method finds the conical angle from the radii and separation of the rings. In the image captured of the object, the visible ends of the rings will form four points. These four points can be split into pairs for one side of the mostly cylindrical object and one pair for the other side. These two pairs define lines in the image plane. These lines can be extended into planes containing the optical centre of the camera and used to define viewing planes for the edges of the cone defined by the rings.

The method then calculates the position and orientation of the cone by considering the following constraints in order:
  (a) First, the method applies the constraint that the vertex of the cone must lie on the intersection line of the two viewing planes, each plane defined by each pair of image points and the point at the optical centre of the camera, so determines the properties of this intersection line.
  (b) Then the method, uses basic geometry to find the angle between the conical axis and the intersection line of the viewing planes. This constrains the solution to having two possible orientations, and a continuum of positions for the vertex along the intersection line.
  (c) The position of the object along the continuum of position is next to be determined. The method then reduces the degeneracy down to two possible states where the cone is pointing either towards or away from the camera, by using the positions of the rings in the image. The ring positions in the image define lines, and the method constrains that the rings lie on these lines, from geometry, and knowing how far these rings are away from the cone's vertex, the method constrains how far along the viewing planes' intersection lines the vertex must lie, down to a two-state degeneracy for the first ring to be calculated.
  (d) This final two-state degeneracy (i.e. whether the cone is pointing "towards" or "away" from the camera) is broken by calculating the distance away for the second ring, knowing its distance from the vertex, and the possible angles between the conical axis and the viewing planes' intersection lines. This fully constrains the solution, allowing the method to use the geometry to find both the position and orientation of the mostly cylindrical object with rings on it. The two rings need to be visually distinguishable, so if the two rings have different radii then it needs to be know at which end of the object each ring is (for example the smaller ring may be nearer the nib of a pen while the larger radius ring is nearer the back end of a pen, so the method needs to know which ring is at which end and what rings they correspond to in the image), but alternatively other options exist for making the two rings visually distinguishable including: the rings may be different colours; the rings may each have a different pattern; the rings may be surrounded by different coloured, shaped or patterned bordering sections of the object on which the rings are provided; or the rings may have relatively different thicknesses.

Any system features as described herein may also be provided as method features, and vice versa. As used herein, means plus function features may be expressed alternatively in terms of their corresponding structure.

Any feature in one aspect may be applied to other aspects, in any appropriate combination. In particular, method aspects may be applied to system aspects, and vice versa. Furthermore, any, some and/or all features in one aspect can be applied to any, some and/or all features in any other aspect, in any appropriate combination.

It should also be appreciated that particular combinations of the various features described and defined in any aspects can be implemented and/or supplied and/or used independently.

The invention claimed is:

1. A method for determining a position and orientation of a cylindrical object or a cylindrical part of an object using image data collected from a single imaging device and/or a single viewpoint wherein the image data comprises one or more images, the cylindrical object or the cylindrical part of the object having one or more rings circumscribing the surface of the cylindrical object or the cylindrical part of the object, the method comprising:
   identifying two or more lines in at least one of the one or more images;
   identifying one or more points on each of the one or more rings circumscribing the surface of the cylindrical object or the cylindrical part of the object; and
   determining the position and orientation of the cylindrical object or the cylindrical part of the object from the two or more lines and the one or more points on each of the one or more rings circumscribing the surface of the cylindrical object or the cylindrical part of the object, wherein identifying the two or more lines comprises determining two or more edge lines of the cylindrical object or the cylindrical part of the object, and wherein two or more points are determined on the two or more edge lines, wherein identifying two or more lines comprises determining a centre line, wherein the centre line comprises an end point and a start point of the cylindrical object or the cylindrical part of the object, and wherein the two or more lines and the two or more points on each of the two or more lines are input into an algorithm, and wherein the algorithm comprises:
      determining two or more planes, wherein the two or more planes comprise two or more bounding planes and a plane perpendicular to the centre line on the image data, and wherein the plane perpendicular to the centre line passes through the end point or the start point of the cylindrical object or the cylindrical part of the object;
      determining an infinite cylinder on the cylindrical object or the cylindrical part of the object, wherein the infinite cylinder is determined using an arbitrary point on the centre line, a direction of the centre line, and a radius of a cross-section of the cylindrical object or the cylindrical part of the object;
      determining a plurality of normals, wherein the plurality of normals comprise two or more outward-facing normals on the two or more bounding planes;
      determining one or more directions, wherein the one or more directions comprise a direction of the infinite cylinder and a direction to the arbitrary point on the centre line from an origin of a cross section of the cylindrical object or the cylindrical part of the object, wherein the direction of the infinite cylinder is perpendicular to the two or more outward-facing normals;
      determining one or more distances, wherein the one or more distances comprise a distance to the arbitrary point on the centre line from the origin;
      determining a plurality of three-dimensional vectors, wherein the plurality of three-dimensional vectors comprise a three-dimensional vector for each of the two or more points determined on the two or more edge lines;
      determining a plurality of equations, including an equation for the centre line of the infinite cylinder; and
      determining one or more meeting points, wherein the one or more meeting points comprise a point where one of the planes intersects with two or more of the two or more lines.

2. The method of claim 1, wherein the cylindrical object or the cylindrical part of the object comprises two or more rings circumscribing the surface of the cylindrical object or the cylindrical part of the object,
   wherein identifying the one or more points on each of the one or more rings comprises identifying two or more points on each of the two or more rings circumscribing the surface of the cylindrical object or the cylindrical part of the object; and
   wherein determining the position and orientation of the cylindrical object or the cylindrical part of the object comprises determining the position and orientation of the cylindrical object or the cylindrical part of the object from the two or more points on each of the two or more rings circumscribing the surface of the cylindrical object or the cylindrical part of the object.

3. The method of claim 2, wherein a portion of the cylindrical object or the cylindrical part of the object is an untracked portion of the cylindrical object or the cylindrical part of the object, and wherein the untracked portion of the cylindrical object or the cylindrical part of the object is between the two or more rings circumscribing the surface of the cylindrical object or the cylindrical part of the object.

4. The method of claim 2, further comprising: determining one or more candidates of the cylindrical object or the cylindrical part of the object, wherein determining the one or more candidates comprises a calibration stage, wherein the calibration stage comprises
   positioning the cylindrical object or the cylindrical part of the object in a particular orientation and/or location,
   imposing minimum and maximum distances from the single imaging device,
   projecting the size of a diameter of the cylindrical object or the cylindrical part of the object, and
   beginning a tracking process if the cylindrical object or the cylindrical part of the object is within the maximum and minimum distances from the single imaging device.

5. The method of claim 2, further comprising:
   identifying two or more lines bounding the cylindrical object or the cylindrical part of the object;
   determining a direction of the cylindrical object or the cylindrical part of the object; and
   determining the location of a front/back end of the cylindrical object or the cylindrical part of the object.

6. The method of claim 2, wherein a predictive model determines one or more positions of the cylindrical object or the cylindrical part of the object, wherein the predictive model comprises a three-dimensional model of the cylindrical object or the cylindrical part of the object and uses one or more previous positions of the cylindrical object or the cylindrical part of the object, and wherein the one or more positions of the cylindrical object or the cylindrical part of the object is stored as position data to be used as the one or more previous positions.

7. The method of claim 1, wherein: each radius of each ring circumscribing the surface of the cylindrical object or the cylindrical part of the object is predetermined and wherein each distance between each of the rings circumscribing the surface of the cylindrical object or the cylindrical part of the object is predetermined.

8. The method of claim 1, wherein the radii of each of the rings are different or wherein each ring can be distinguished from each other ring visually.

9. The method of claim 8, wherein:
the rings comprise different coloured rings and/or different patterned rings; and/or
the cylindrical object or the cylindrical part of the object comprises different coloured or patterned or shaped regions bordering each ring in order to provide visual distinction between the rings.

10. The method of claim 1, further comprising: determining one or more candidates of the cylindrical object or the cylindrical part of the object by determining an angle between the two or more edge lines of the cylindrical object or the cylindrical part of the object.

11. The method of claim 1, comprising:
determining an image ray;
identifying two or more points on the same edge of the cylindrical object or the cylindrical part of the object; and
determining one or more distances of separation between the two or more points on the same edge of the cylindrical object or the cylindrical part of the object.

12. The method claim 11, comprising: determining the three-dimensional position of the two or more points on the same edge as the cylindrical object or the cylindrical part of the object.

13. The method of claim 1, comprising: determining one or more dimensional information and/or one or more surface image information of the cylindrical object or the cylindrical part of the object from the image data.

14. The method of claim 1, comprising:
determining two or more planes containing the two or more lines;
determining the axis of the cylindrical object or the cylindrical part of the object;
determining at least one pair of one or more corner points;
determining one or more view vectors of at least one pair of one or more corner points;
determining a difference vector and an average vector which are constrained to lay in the two or more planes; and
determining a centre point of the cross-section of the cylindrical object or the cylindrical part of the object.

15. The method of claim 1, wherein identifying two or more lines comprises determining six or more points on the cylindrical object or the cylindrical part of the object including the two or more points on the two or more edge lines and two or more points on the centre line.

16. The method of claim 1, wherein the two or more lines comprises the centre line and one or more of: a near edge line of the cylindrical object or the cylindrical part of the object; and/or a far edge line of the cylindrical object or the cylindrical part of the object.

17. The method of claim 1, wherein the cylindrical object or the cylindrical part of the object is a stylus, pen, or wand.

18. The method of claim 1, wherein the cylindrical object or the cylindrical part of the object is operable for use in a human hand.

19. A method for determining an orientation of a cylindrical object or the cylindrical part of the object using image data collected from a single imaging device and/or a single viewpoint wherein the image data comprises one or more images, the method comprising:

identifying a plurality of pairs of lines in at least one of the one or more images;
identifying one or more points on each of one or more rings circumscribing the surface of the cylindrical object or the cylindrical part of the object; and
determining the orientation of the cylindrical object or the cylindrical part of the object from the plurality of pairs of lines and the one or more points on each of one or more rings circumscribing the surface of the cylindrical object or the cylindrical part of the object, wherein identifying the plurality of pairs of lines comprises determining two or more edge lines of the cylindrical object or the cylindrical part of the object, and wherein two or more points are determined on the two or more edge lines, wherein identifying the plurality of pairs of lines comprises determining a centre line, wherein the centre line comprises an end point and a start point of the cylindrical object or the cylindrical part of the object, and wherein the plurality of pairs of lines and the two or more points on each of the plurality of pairs of lines are input into an algorithm, and wherein the algorithm comprises:
determining two or more planes, wherein the two or more planes comprise two or more bounding planes and a plane perpendicular to the centre line on the image data, and wherein the plane perpendicular to the centre line passes through the end point or the start point of the cylindrical object or the cylindrical part of the object;
determining an infinite cylinder on the cylindrical object or the cylindrical part of the object, wherein the infinite cylinder is determined using an arbitrary point on the centre line, a direction of the centre line, and a radius of a cross-section of the cylindrical object or the cylindrical part of the object;
determining a plurality of normals, wherein the plurality of normals comprise two or more outward-facing normals on the two or more bounding planes;
determining one or more directions, wherein the one or more directions comprise a direction of the infinite cylinder and a direction to the arbitrary point on the centre line from an origin of a cross section of the cylindrical object or the cylindrical part of the object, wherein the direction of the infinite cylinder is perpendicular to the two or more outward-facing normals;
determining one or more distances, wherein the one or more distances comprise a distance to the arbitrary point on the centre line from the origin;
determining a plurality of three-dimensional vectors, wherein the plurality of three-dimensional vectors comprise a three-dimensional vector for each of the two or more points determined on the two or more edge lines;
determining a plurality of equations, including an equation for the centre line of the infinite cylinder; and
determining one or more meeting points, wherein the one or more meeting points comprise a point where one of the planes intersects with at least one of the plurality of pairs of lines.

20. The method of claim 19, wherein the cylindrical object or the cylindrical part of the object is a stylus, pen, wand, or other object that is operable for use in a human hand.

* * * * *